United States Patent [19]

DeMarco

[11] Patent Number: 4,850,135
[45] Date of Patent: Jul. 25, 1989

[54] APPARATUS FOR STIMULATING PLANT GROWTH UNDER CONTROLLED CONDITIONS

[76] Inventor: Jeffery J. DeMarco, c/o Pyraponic Industries, Inc. II, 500 N. Mannheim Rd., Suite No. 5, Hillside, Ill. 60162

[21] Appl. No.: 160,923
[22] Filed: Feb. 26, 1988
[51] Int. Cl.⁴ ............................................. A01G 9/00
[52] U.S. Cl. .................................. 47/17; 47/DIG. 6
[58] Field of Search ................... 47/17, 19, 39, 66, 76, 47/18, 26, 63, DIG. 6; 119/5, 35

[56] References Cited

U.S. PATENT DOCUMENTS

| | | | |
|---|---|---|---|
| 1,300,245 | 4/1919 | Bussey | 47/19 |
| 2,497,381 | 2/1950 | Wade, Sr. | 47/19 |
| 3,066,445 | 12/1962 | D'Amico | 47/19 |
| 3,106,801 | 10/1963 | Risacher | 47/19 |
| 3,667,158 | 6/1972 | Privett | 47/17 |
| 3,950,637 | 4/1976 | Rodin | 47/26 |
| 4,045,911 | 9/1977 | Ware | 47/DIG. 6 |
| 4,244,145 | 1/1981 | Polacsek | 47/17 |
| 4,349,864 | 9/1982 | Smith | 47/39 |
| 4,414,784 | 11/1983 | Masters | 47/17 |
| 4,543,744 | 10/1985 | Royster | 47/17 |
| 4,679,350 | 7/1987 | Banta | 47/17 |

Primary Examiner—Robert A. Hafer
Assistant Examiner—Charles H. Sam
Attorney, Agent, or Firm—Lewis H. Eslinger; Donald S. Dowden

[57] ABSTRACT

Apparatus for stimulating plant growth under controlled conditions comprises a housing having a lower portion, an upper portion, a hollow interior in which plants are grown and an exterior. Fluorescent lamps mounted within the interior stimulate growth of the plants. The housing is formed with vacuum-metalized walls or panels which, when illuminated by the lamps, reflect a major proportion of light into the interior. The housing is further formed with a lower vent and an upper vent to facilitate circulation of air through the interior. The lower vent substantially surrounds the lower portion of the housing and the upper vent substantially surrounds the upper portion of the housing to optimize the flow of air. The lower and upper vents are formed and located with respect to the lamps and walls so as substantially to block passage of light through the vents from the interior to the exterior.

5 Claims, 4 Drawing Sheets

APPARATUS FOR STIMULATING PLANT GROWTH UNDER CONTROLLED CONDITIONS

BACKGROUND OF THE INVENTION

1. Field of the Invention

This invention relates to apparatus for stimulating plant growth under controlled conditions and, more particularly, to novel and highly-effective apparatus that is better adapted than prior apparatus to circulate air around the plants grown within the apparatus, to provide photostimulation of plants housed within the apparatus without enabling substantial escape of light from the interior of the apparatus, and to control and optimize the conditions of plant growth.

2. Description of the Prior Art

There is a great need for indoor laboratory apparatus capable of performing carefully controlled experiments relating to plant physiology and of maximizing the production of cultivated plants in a given period of time and utilizing a given amount of space. The great majority of cultivated plants are of course grown outdoors in a more-or-less natural setting in order to take advantage of sunlight, rain, soil and the vast amount of available space. However, the cultivation of plants in natural settings outdoors has certain drawbacks.

For one thing, it is not possible under such conditions to perform carefully controlled experiments to determine optimum levels of plant temperature, nutrition, watering and exposure to light or to determine whether genetic or environmental factors are responsible for certain observed differences among plants.

Moreover, rainfall is in general not adequately predictable and at different times may be too much or too little. Control of watering outdoors by means of irrigation degrades the soil over extended periods of time because of salt and other deposits left by evaporating water. Sunlight is more predictable than rainfall but is essentially uncontrollable. It varies with cloud cover (which is not adequately predictable or controllable) and with the season, latitude, and other factors. Soil quality can be analyzed and controlled to a degree with fertilizer but is always changing because of erosion, runoff from adjacent fields, depletion by plant uptake of nutrients, enrichment by plant decay, etc. Because of these problems, many scientific experiments of significant merit cannot be performed in a natural outdoor setting or even in an outdoor setting in which conditions are partially controlled through use of irrigation, fertilizer, etc.

In recognition of the problems attendant upon the cultivation of plants outdoors for scientific purposes and for the purpose of maximizing the production of plants per unit of space-time, minimizing the inter-nodal length between budding sites, and optimizing the "root to shoot to fruit ratio", significant efforts have been made for many years to develop indoor laboratory apparatus capable of performing carefully controlled experiments relating to plant physiology and of regulating and optimizing the conditions of plant growth.

It is believed that the most advanced, sophisticated and successful laboratory apparatus heretofore developed for this purpose is a device invented but not patented by the present applicant. The prior apparatus provides for controlling the lighting, watering, nutrition and temperature of plants grown therein. The lighting is provided by columnar (linear) fluorescent lamps ("stick lights") arranged around the interior perimeter of the housing with their respective longitudinal axes oriented vertically. The lighting is turned on and off in a regular cycle that provides photostimulation of the plants within the housing alternating with periods of relative darkness. Watering is done manually. Nutrition is tailored to the specific needs of the plants grown in the apparatus by analyzing the soil after a period of growth to determine which nutrients the plants have taken up and in what amounts. The nutrients required by the plants are thereafter supplied in the correct proportions at regular intervals. Temperature is controlled by keeping the apparatus indoors and by providing vents for the circulation of air through the apparatus.

However, the vents are formed and located with reference to the light sources and interior reflective surfaces of the housing so as to enable the passage of a substantial light flux from the interior to the exterior of the housing. This reduces the efficiency of the apparatus, since a certain percentage of the light generated makes no contribution to the stimulation of plant growth and is thus "wasted".

The requirements of temperature control by air circulation and maximum utilization of the light flux for photostimulation of the plants grown in the apparatus are to some extent contradictory. In order to provide adequate circulation of air, the vents must be of adequate size. Vents of adequate size for air circulation tend to enable the escape of a substantial flux of light from the apparatus, thereby reducing the efficiency of the light in stimulating plant growth.

It has been found moreover that the distribution of light from columnar lamps is not totally uniform and that the assembly of the device including, for example, six columnar lamps is more time-consuming than one would wish, particularly in a laboratory where many such devices are maintained.

OBJECTS AND SUMMARY OF THE INVENTION

An object of the invention is to remedy the problems outlined above and, in particular, to provide laboratory apparatus that is better adapted than any heretofore known to circulate air around plants grown within the apparatus, to provide photostimulation of plants housed in the apparatus without enabling escape of a substantial flux of light from the interior of the apparatus, and to control and optimize the conditions of plant growth.

In particular, an object of the invention is to provide apparatus that minimizes the inter-nodal length between budding sites and optimizes the "root to shoot to fruit ratio".

Another object of the invention is to provide apparatus as described above that can be assembled more easily and quickly than prior such apparatus.

In accordance with one aspect of the invention, the foregoing and other objects are attained by the provision of apparatus comprising a housing having a lower portion, an upper portion, a hollow interior in which plants are grown and an exterior and lighting means mounted within the interior for stimulating the growth of the plants, the housing being formed with a plurality of walls having interior surfaces and, when illuminated by the lighting means, reflecting a major proportion of light into the interior, the housing being further formed with a lower vent and an upper vent to facilitate circulation of air through the interior, the lower vent substantially surrounding the lower portion of the housing and the upper vent substantially surrounding the upper portion of the housing, and the lower and upper vents being formed and located with respect to the lighting means so as substantially to block the passage of light through the vents from the interior to the exterior.

BRIEF DESCRIPTION OF THE DRAWINGS

A better understanding of the objects, features and advantages of the invention can be gained from a consideration of the following detailed description of the preferred embodiment thereof, wherein a given reference character always designates the same element or part and wherein.

DESCRIPTION OF THE PREFERRED EMBODIMENT

Figure 3:
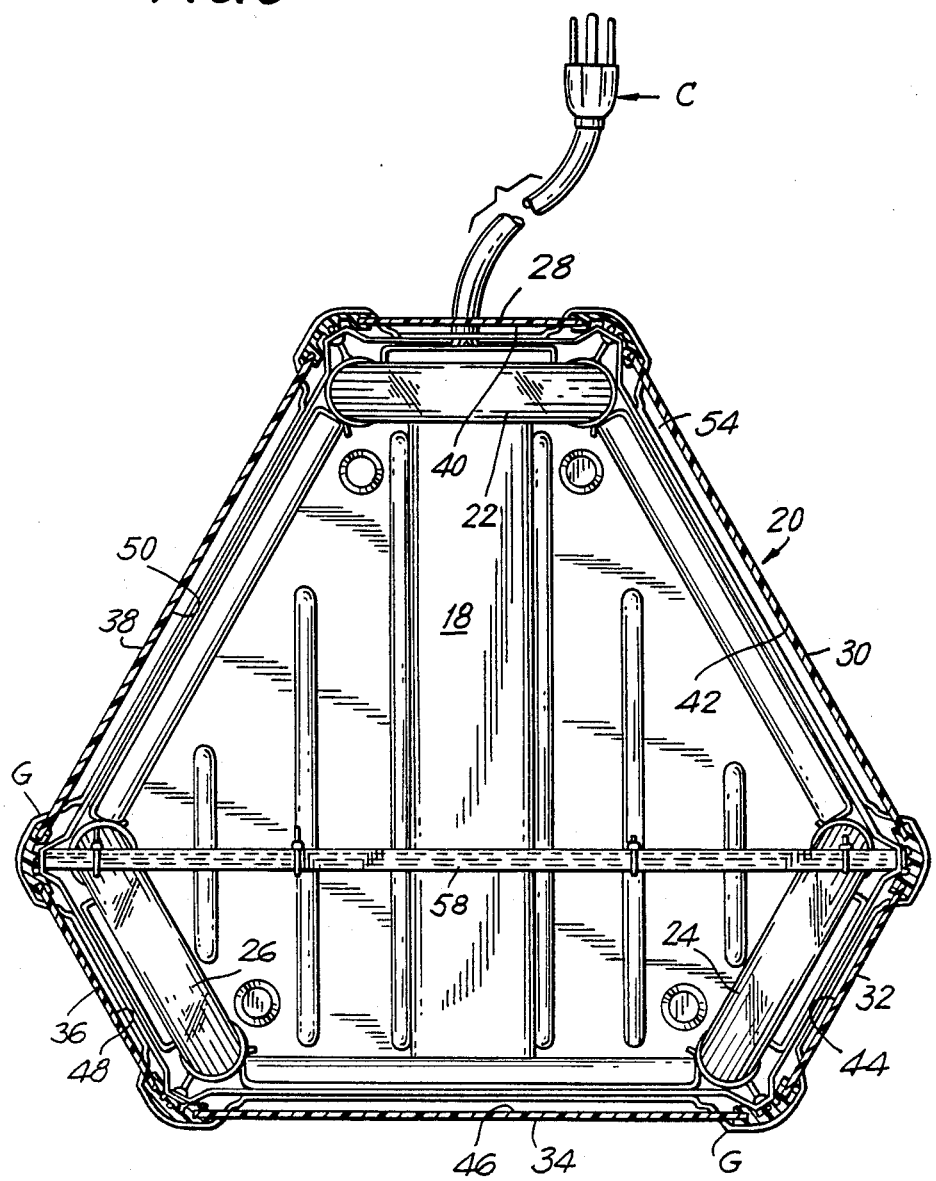
FIG. 3 is a sectional view taken generally along the line 3—3 of FIG. 1 and looking in the direction of the arrows.
Figure 4:
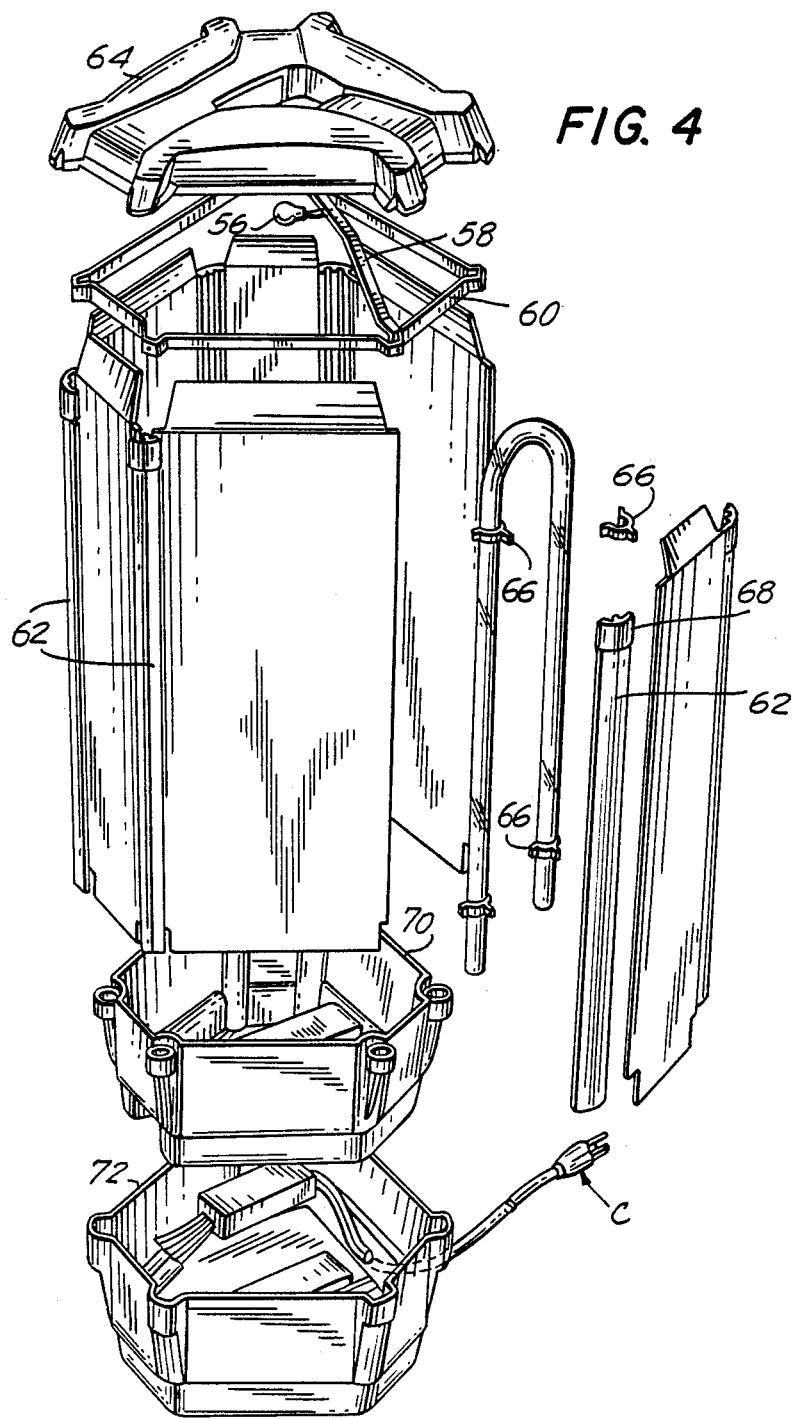
FIG. 4 is an exploded perspective view of the apparatus.

The figures show apparatus 10 constructed in accordance with the invention for stimulating plant growth under controlled conditions. The apparatus 10 comprises a housing 12 having a lower portion 14 and an upper portion 16, a hollow interior 18 (FIG. 3) in which plants (not shown) are grown and an exterior 20. Lighting means is provided comprising fluorescent lamps 22, 24, 26 mounted within the interior 18 for stimulating growth of the plants. A cordset C enables connection to house current. The housing 12 is formed with a plurality of vacuum-metalized walls or panels 28, 30, 32, 34, 36, 38 having interior surfaces 40, 42, 44, 46, 48, 50. When illuminated by the lighting means 22, 24, 26, the walls or panels reflect a major proportion of light into the interior 18. Alternate panels 28, 32 and 36 are narrower than the remaining panels 30, 34, 38, but all of the panels have the same height and thickness. The tops T of the panels are bent inwardly in order better to reflect light emanating from the lamps 22, 24, 26 back into the interior 18 and prevent its escape.

Figure 1:
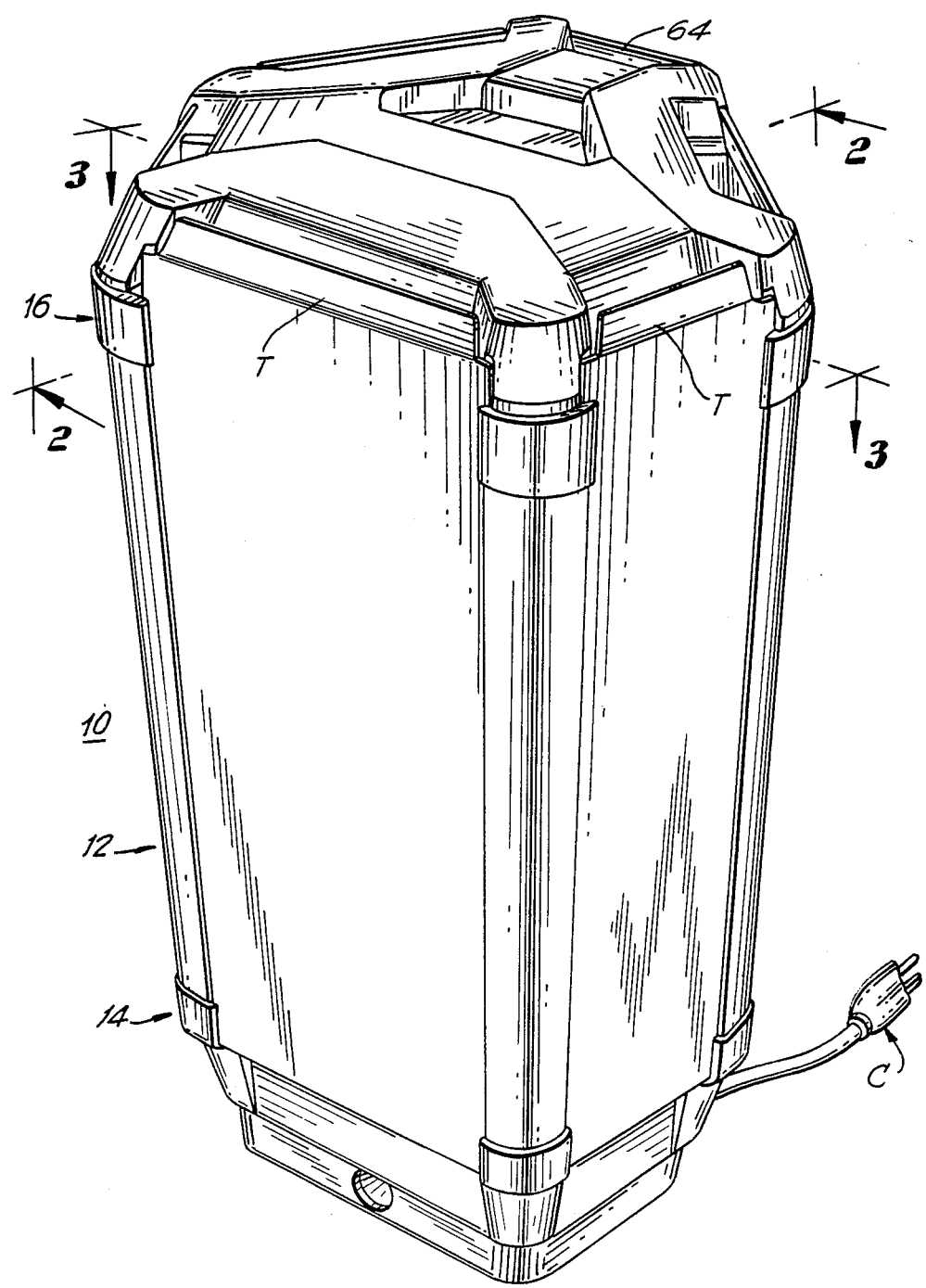
FIG. 1 is a perspective view of apparatus constructed in accordance with the invention.
Figure 2:
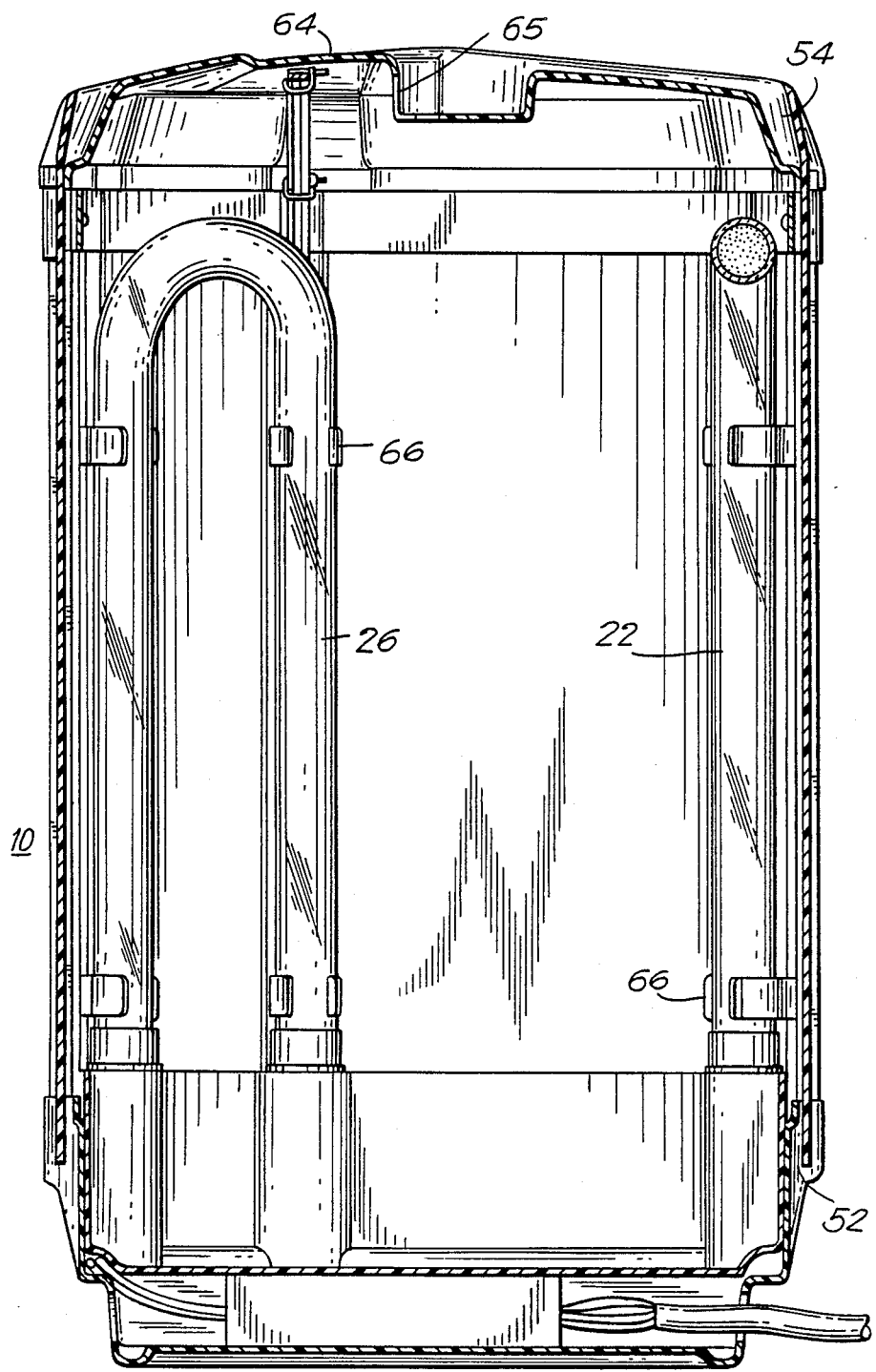
FIG. 2 is a sectional view taken generally along the line 2—2 of FIG. 1 and looking in the direction of the arrows.

The housing 12 is further formed with a lower vent 52 (best shown in FIG. 2) and an upper vent 54 to facilitate circulation of air through the interior 18. The lower vent 52 substantially surrounds the lower portion 14 of the housing 12, and the upper vent 54 substantially surrounds the upper portion 16 of the housing 12. The lower and upper vents 52, 54 are formed and located with respect to the lamps 22, 24, 26 and the walls 28, 30, 32, 34, 36, 38 so as substantially to block the passage of light from the interior 18 to the exterior 20.

Since the walls 28, 30, 32, 34, 36, 38 are vacuum-metalized, they function as one-way mirrors or one-way glasses. That is, they are clear and transparent or opaque and reflective as viewed, for example, from outside the apparatus 10, depending on whether or not they are illuminated by the lamps 22, 24, 26. In accordance with the invention there is no substantial escape of light from the interior 18 to the exterior 20 of the apparatus 10. When the lamps 22, 24, 26 are turned on, the vacuum-metalized walls 28, 30, 32, 34, 36, 38 function as one-way mirrors that reflect most of the light emanating from the lamps into the interior 18 of the apparatus 10. Since the walls function as one-way mirrors, the lamps when turned on can be seen from the outside of the apparatus, as can the plants grown within the apparatus. This of course implies the transmission of a certain minimum amount of light by the walls. This is desirable since it enables researchers or other users of the apparatus visually to monitor the progress and condition of the plants without opening the apparatus.

The fluorescent lamps 22, 24, 26 are respectively mounted in closely-spaced-apart relation to the walls and particularly to selected walls such as the relatively narrow panels 28, 32, 36, respectively. Each fluorescent lamp is U-shaped and mounted with the U inverted. The lighting means may further comprise an incandescent lamp 56 mounted within the interior 18 in the upper portion 16 of the housing 12 adjacent to the upper vent 54. The incandescent lamp 56 is attached to a handle 58 which is connected to a structural ring 60. The ring 60 is supported adjacent to the upper vent 54 by six vertically extending extrusions 62 spaced around the periphery of the housing 12 in alternating relation with the walls or panels. The extrusions 62 are formed with vertically extending grooves G within which the panels 28, 30, 32, 34, 36, 38 slide vertically. The panels can thus be easily installed by sliding them in from the top and also easily removed to facilitate pruning of the plants. A removable top or cover piece 64 is formed with a slot 65 (best shown in FIG. 2) which serves as an auxiliary vent to promote uniform and efficient air flow and through which the handle 58 may be grasped for lifting the apparatus 10.

Twelve clamps such as the clamps 66 are provided for clamping each leg of each lamp at the top and bottom. The lamps are thus securely supported and not likely to be broken accidentally. Six fascia pieces 68 are provided for placement at the tops of the respective extrusions 62, and a removable protective liner 70 fits within a base 72.

Thus there is provided in accordance with the invention novel and highly-effective apparatus that is better adapted than prior such apparatus to circulate air around plants grown within the apparatus, to provide photostimulation of plants housed within the apparatus without enabling escape of light from the interior of the apparatus, and to control and optimize the conditions of plant growth. The apparatus includes U-shaped fluorescent lamps that provide better light distribution because of the horizontal connecting part of the U and are easily and quickly installed because the number of lamps is reduced by 50% as compared to the prior apparatus.

Many modifications of the preferred embodiment of the invention disclosed herein will readily occur to those skilled in the art upon consideration of this disclosure. For example, the size of the apparatus 10 and of the walls or panels 28, 30, 32, 34, 36, 38, the wattage and spectral output distribution of the lamps employed, and the selection of plants grown within the apparatus can be varied within wide limits. Accordingly, the invention is to be construed as including all structure that falls within the scope of the appended claims.

I claim:

1. Apparatus comprising:
    a housing having a lower portion, an upper portion, a hollow interior in which plants are grown and an exterior and
    substantially U-shaped lighting means mounted within said interior with the U inverted and said lighting means substantially surrounding said plants for stimulating growth of said plants, said housing being formed with a plurality of vacuum-metalized walls having tops that are bent inwardly and having interior surfaces and, when illuminated by said lighting means, reflecting a major proportion of light into said interior, said housing being further formed with a lower vent and an upper vent to facilitate circulation of air through said interior, said lower vent substantially surrounding said lower portion of said housing and said upper vent substantially surrounding said upper portion of said housing, and said lower and upper vents being formed and located with respect to said lighting means and said walls so as substantially to prevent the passage of light through said vents from said interior to said exterior.

2. Apparatus according to claim 1 wherein said walls as viewed from said exterior are transparent when they are illuminated by said lighting means and reflective when they are not illuminated by said lighting means.

3. Apparatus according to claim 1 wherein said lighting means comprises a plurality of fluorescent lamps respectively mounted in closely-spaced-apart relation to said walls.

4. Apparatus according to claim 1 wherein said lighting means further comprises an incandescent lamp mounted within said interior in said upper portion adjacent to said upper vent.

5. Apparatus according to claim 1 further comprising a plurality of vertically extending extrusions spaced around said housing in alternating relation with said walls and formed with grooves in which said walls are respectively slidable vertically, a structural ring supported by said extrusions adjacent to said upper vent, a handle connected to said structural ring, and a removable top, said top being formed with a substantially centrally located slot which serves as an auxiliary vent to promote uniform and efficient air flow and through which said handle may be grasped for lifting said apparatus.

* * * * *